Patented Sept. 1, 1931

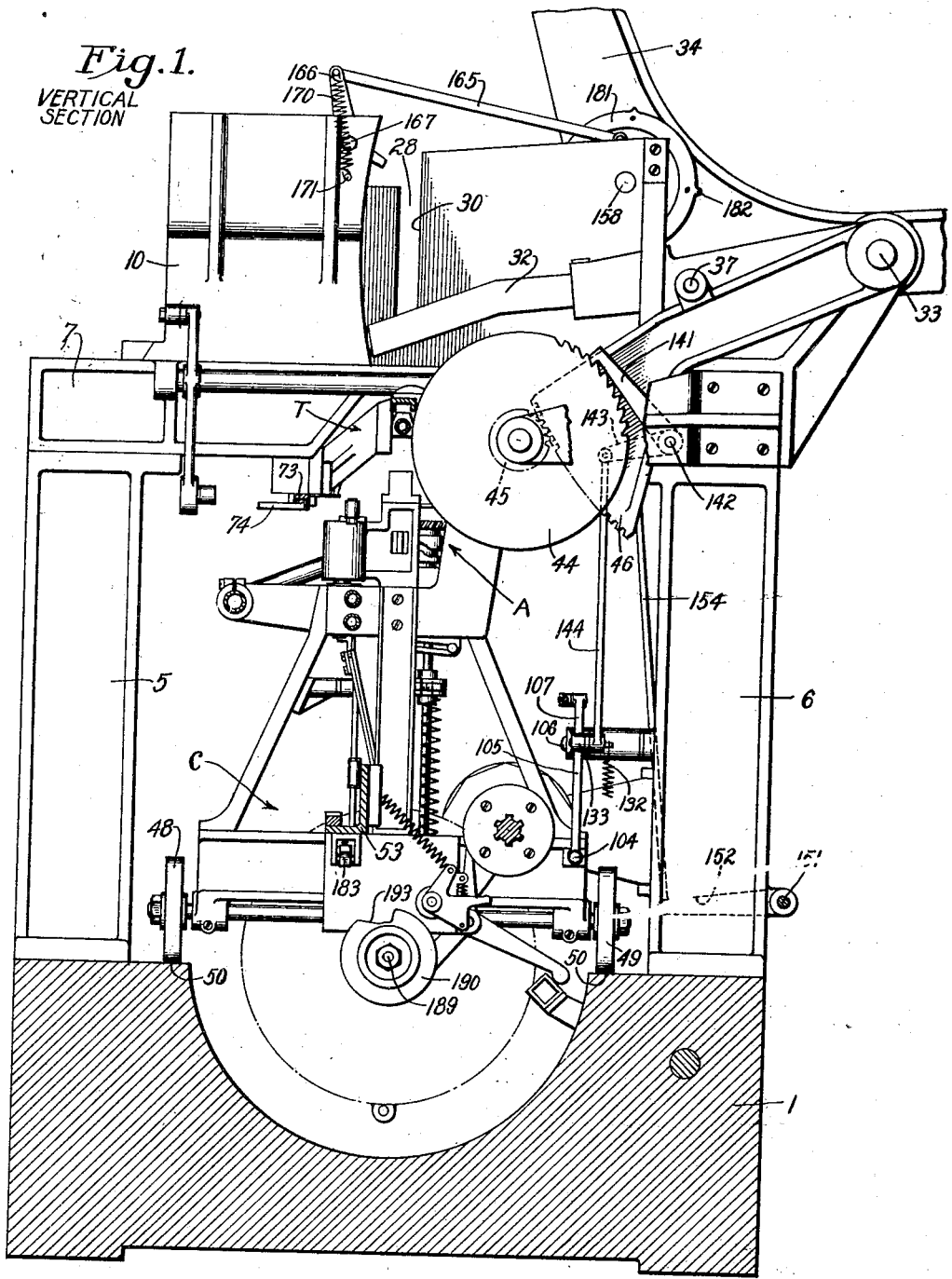

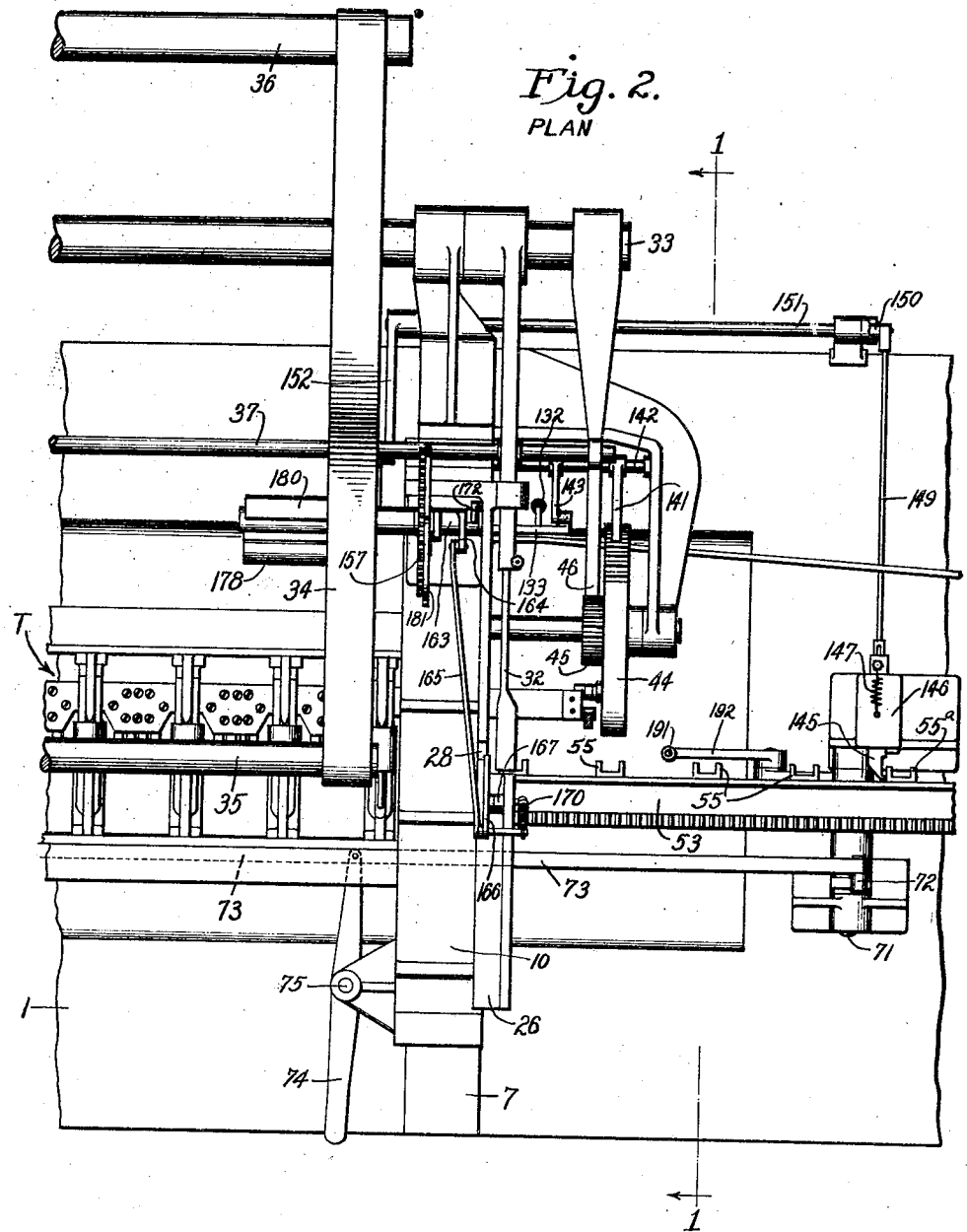

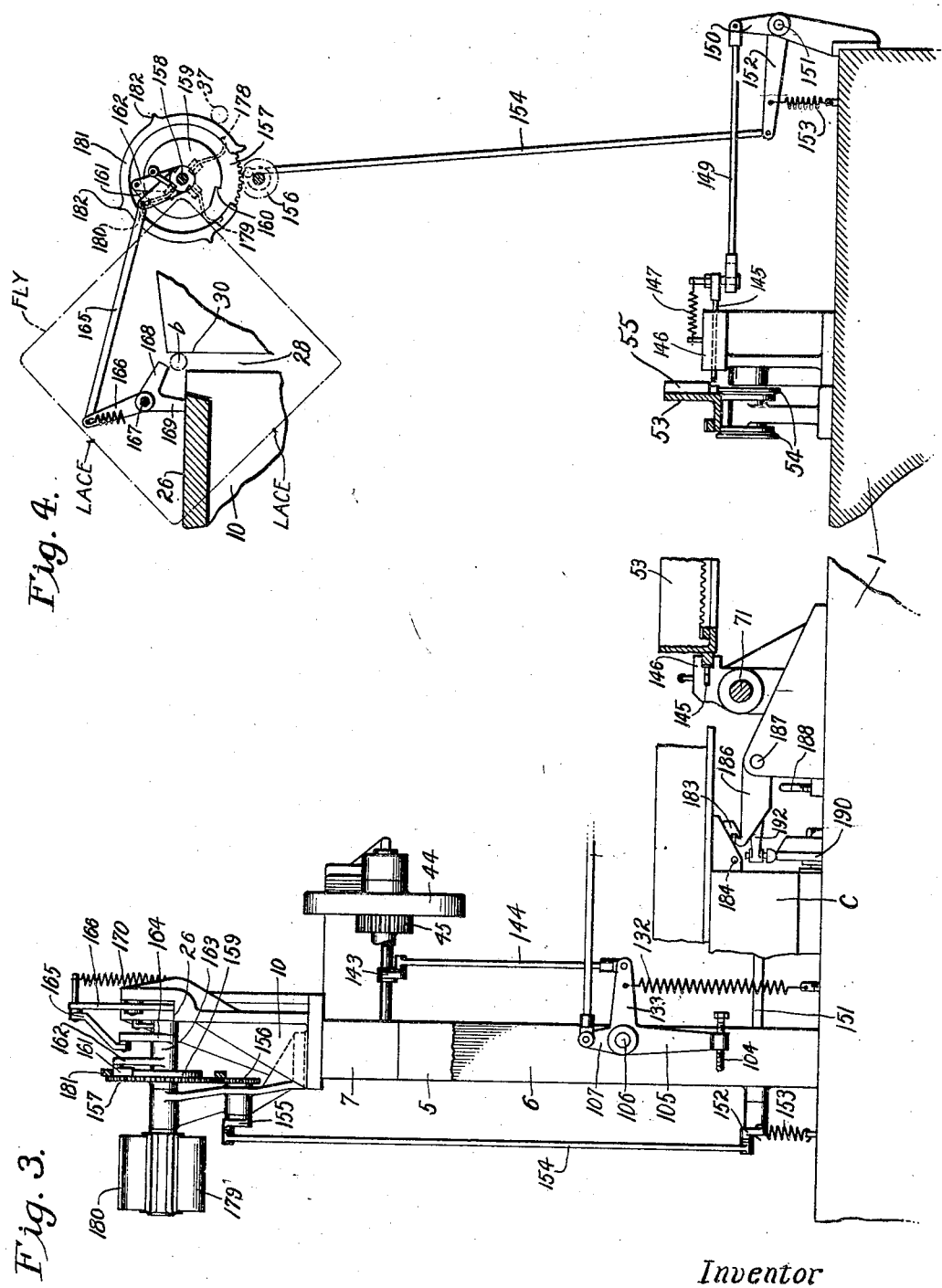

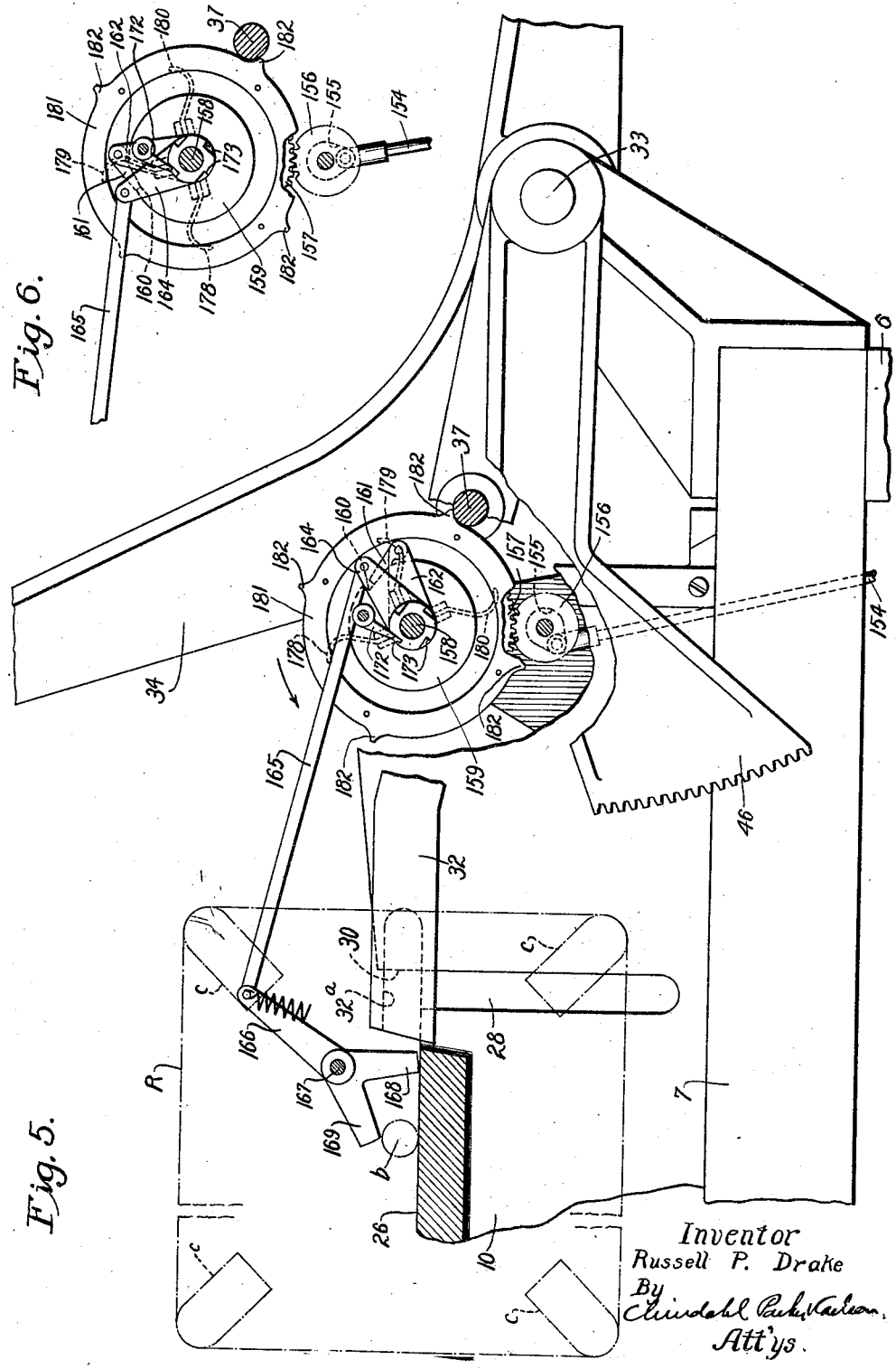

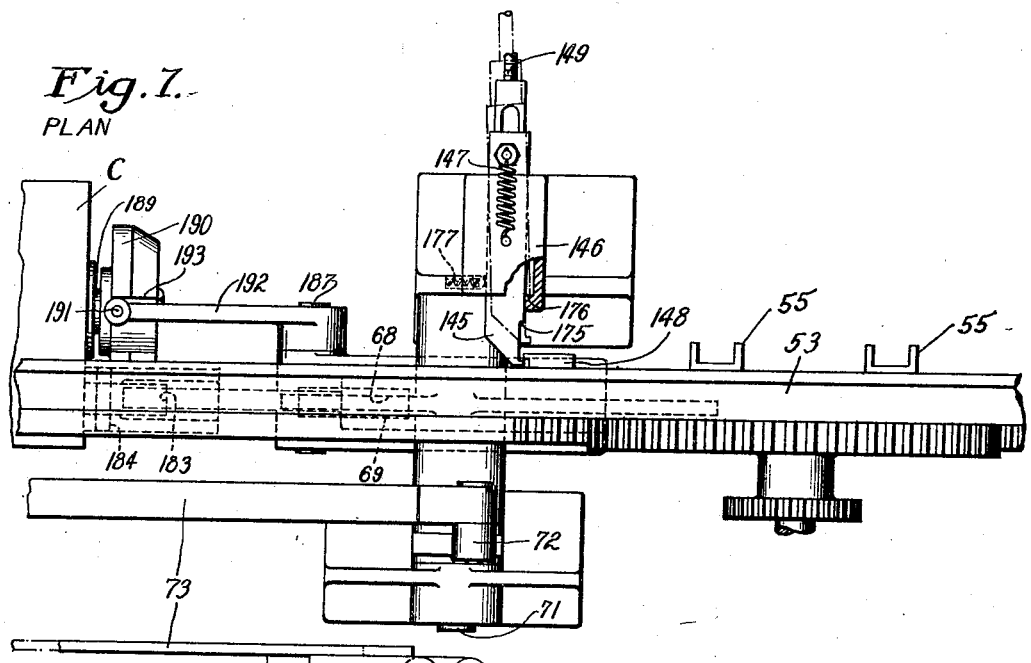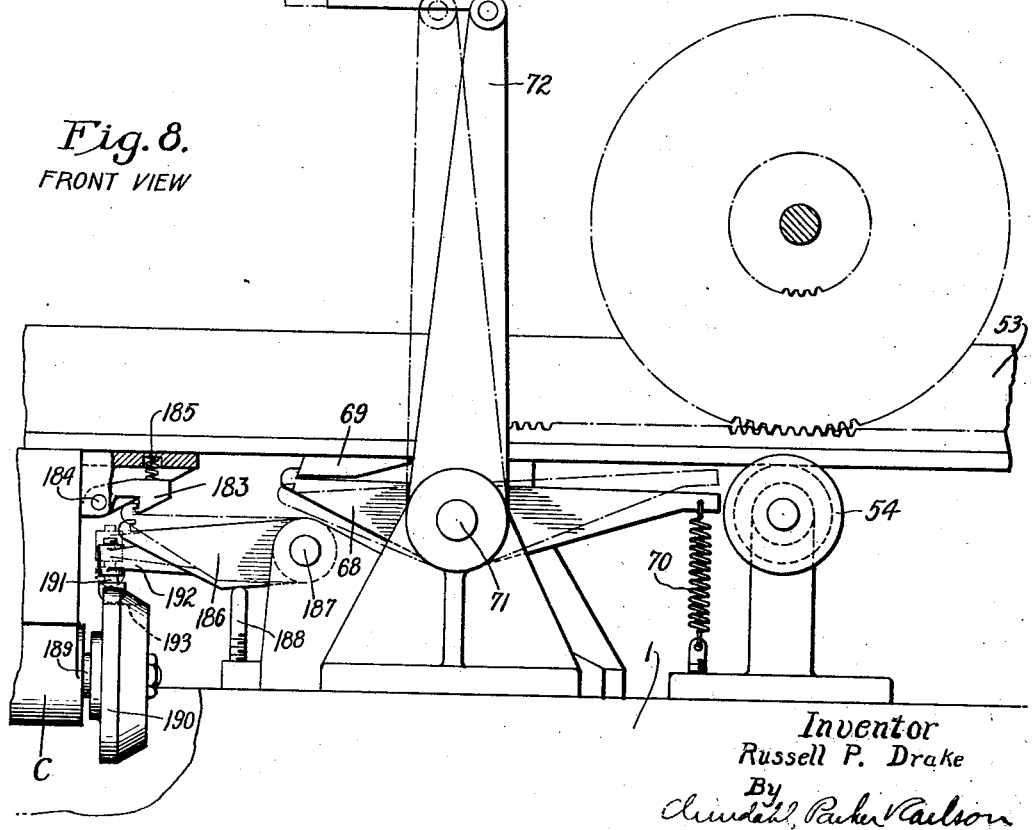

1,821,545

UNITED STATES PATENT OFFICE

RUSSELL P. DRAKE, OF ROCKFORD, ILLINOIS, ASSIGNOR TO BARBER-COLMAN COMPANY, OF ROCKFORD, ILLINOIS, A CORPORATION OF ILLINOIS

SKEIN LACING MACHINE

Application filed November 7, 1927, Serial No. 231,680. Renewed February 2, 1931.

This invention has particular, although not exclusive, reference to skein-lacing machines of the type disclosed in application Serial No. 225,621, filed October 12, 1927, and application Ser. No. 272,029, filed April 23, 1928, by Howard D. Colman, (now Patents Nos. 1,774,592 and 1,784,984, respectively).

One of the objects of the invention is to provide means to prevent the fly from being raised after the carriage has started to move from its idle position to its initial position and before the carriage has returned to its idle position.

Another object of the invention is to provide means to prevent the carriage from being returned to initial position until after the fly has been indexed.

Another object is to provide means to prevent the carriage from being returned to initial position until after a completely laced fly has been replaced with another fly.

A further object of the invention is to provide means to prevent the carriage from being returned to initial position if the lacing and knot-tying mechanisms on the carriage are not in their initial position.

In the accompanying drawings—

Figure 1 is a vertical sectional view of a skein-lacing machine embodying features of my invention, the view being taken approximately in the plane of dotted line 1—1 of Fig. 2.

Fig. 2 is a fragmental plan view of the machine.

Fig. 3 is a fragmental front view showing certain devices for latching the lacing carriage in the idle or thirteenth position, and safety mechanisms for insuring proper indexing of the fly.

Fig. 4 is a fragmental vertical view showing the safety mechanisms just referred to.

Fig. 5 is a view generally similar to Fig. 4, but showing the parts in another position.

Fig. 6 shows the position assumed upon the introduction of a fly into the machine, the shaft of the fly having passed the finger 168.

Fig. 7 is a plan view showing certain devices for latching the lacing carriage in the idle or thirteenth position.

Fig. 8 is a front view of the parts shown in Fig. 7.

The form of fly R indicated in Fig. 5 comprises four bars $c$ supported upon a central shaft $b$. While the embodiment herein shown of my invention is especially adapted to operate upon a four-sided fly, it is to be understood that the mechanism may be adapted to operate upon a fly having a different number of sides.

The main frame of the machine includes a base 1, uprights 5 and 6, and a horizontal beam 7 attached to the upper ends of the uprights 5 and 6. Means is provided to support and move the ends of the shaft $b$ of the fly, the means at one end being a substantially duplicate of that at the opposite end. The drawings illustrate the devices for supporting and moving the right-hand end of the fly. Said devices comprise a casting 10 mounted on the beam 7, the casting 10 having a horizontal ledge 26 to support the right-hand end of the shaft $b$. At the inner end of the ledge 26 is a vertical slot 28 to receive the end of the shaft. The part 30 (Figs. 1 and 4) limits inward horizontal movement of the right-hand end of the fly shaft.

The means for lowering the fly onto the comb T (Fig. 2) which divides the skeins into bundles of strands includes an arm 32 which is mounted upon a shaft 33. The means for swinging the arm 32 to lower and raise the fly includes an arm 34 which is fixed upon the shaft 33 and carries at its forward upper end a hand rod 35 (Fig. 2). The arm 34 is extended rearwardly of the shaft 33 and there carries a counterweight 36. A rod 37 extends through the arms 32 and 34. The inner face of the arm 32 is channeled, as indicated at 32ᵃ in Fig. 5, to receive the right-hand end of the shaft of the fly. The channeled end of the arm extends across the slot 28. When said arm is in its upper position the channeled end of the arm is in alinement with the ledge 26 (see Fig. 5).

As fully explained in application Ser. No. 105,684, filed April 30, 1926, (now Patent No. 1,774,591), the teeth of the comb comprise vibratory elements which are arranged to be repeatedly oscillated by means including an oscillatory cam disk 44 (Fig. 1). Said disk is pivotally supported in the machine frame and is arranged to be oscillated by means comprising a pinion 45 which is fixed to the cam disk and which meshes with a gear segment 46 that is carried by the shaft 33 and the rod 37.

The mechanism for passing a lacing cord around the bundles and for tying together the ends of the cord are indicated generally at A in Fig. 1 and are mounted upon a carriage C having wheels 48 and 49 which travel upon tracks 50 on the base 1. For a disclosure of a mechanism A and a carriage C adapted for use with my invention, reference may be had to the Colman applications, Serial Nos. 105,684 and 272,029. The carriage C is given its working stroke by mechanism which moves it step by step from left to right in Figs. 2, 3, 7 and 8. The knotter unites the ends of the lacing of one skein while the lacing mechanism is lacing the skein in the van. Since there are twelve skeins, it is apparent that the knotter must operate an extra time in order to unite the ends of the lacing of the twelfth skein. The position occupied by the carriage while the lacing of the twelfth skein is being tied is hereinafter termed the idle or thirteenth position.

Upon completing the working stroke, the carriage is latched in the thirteenth position to provide an interval during which the operator may index the fly or substitute another. When the operator is ready, he unlatches the carriage, whereupon spring-actuated means return the carriage to its starting position.

The means for reciprocating the carriage C includes an indexing bar 53, one end of which is rigidly secured to the carriage. The indexing bar is guided and supported by means of rollers 54 (Figs. 4 and 8) on the base 1. On the back of the bar 53 is a series of blocks 55 and 55ᵃ, the purpose of which is fully disclosed in the Colman application, Serial No. 225,621, filed October 12, 1927.

The latch 68 (Fig. 8) for holding the carriage at the end of the working stroke (i. e. in the thirteenth position) against the tension of the spring-actuated means hereinbefore alluded to, is adapted to engage a block 69 secured to the under side of the indexing bar 53. 70 is a spring to hold the latch in operative position. The latch 68 is fixed to a pivot 71 which carries a lever 72. To the lever 72 is pivoted one end of a bar 73 (Figs. 2 and 8) which extends alongside the comb. A starting hand lever 74 is pivoted between its ends at 75 and is connected at its rear end to the bar 73. It will be seen that when the lever 74 is swung to the right in Fig. 2, the latch 68 will be disengaged from the block 69, thereby releasing the carriage to the action of the spring-actuated means which return the carriage to starting position beneath the first skein (the skein farthest to the left). Said spring-actuated means is fully disclosed in the Colman application, Serial No. 225,621.

As the carriage reaches the thirteenth position it engages a stop screw 104 (Fig. 3) carried by an arm 105 which is pivoted at 106 in the machine frame. The arm 105 is rigid with an arm 107 which is arranged to actuate mechanism for throwing out the driving clutch (not shown) and applying a brake (not shown) to stop the machine. The clutch and brake operating mechanism is fully disclosed in the Colman application, Serial No. 225,621. When the carriage is subsequently released to the action of the spring-actuated carriage-returning means, it moves away from the stop screw 104, whereupon a tension spring 132 (Fig. 3) attached to an arm 133 which is rigid with the arm 105, restores the three-arm lever 105—107—133 to its normal position.

Means is provided to prevent the fly from being raised at any time after the carriage has started toward its initial position (below the farthest leftward skein) and before the carriage has returned to its idle or thirteenth position. This means comprises a dog 141 (Fig. 1) which is pivoted at 142 and is arranged to engage ratchet teeth formed on the periphery of the cam disk 44. Rigid with the dog 141 is an arm 143 which is connected by means of a link 144 to the arm 133. As soon as the carriage leaves the thirteenth position, the spring 132 places the dog 141 in engagement with the disk 144 and thereby prevents the operator from lifting the hand rod 35.

Means is provided to prevent the carriage C from being returned to initial position until after the fly has been indexed or until after a completely-laced fly has been replaced with another fly. Said means comprises a secondary latch 145 (Fig. 7) slidably mounted in a guide 146 and arranged to be projected by a tension spring 147 into the path of a locking block 148 on the indexing bar 53. If the operator should withdraw the primary latch 68 from the block 69 while the latch 145 is in the forward position shown in full lines in Fig. 7, the carriage will move to the left a fraction of an inch until the block 148 stops against the latch 145. The latch 145 has a pin-and-slot connection with a link 149 (Fig. 4) that is pivoted to an arm 150. The latter is fixed to a shaft 151 (Fig. 2) on which is secured an arm 152. A spring 153 tends to move said arm 152 downwardly. A link 154 (Figs. 1, 3 and 4) connects the arm 152 to an arm 155 which is rigid with a pinion 156. The latter meshes with a gear wheel 157 which is fixed on a shaft 158. The arm 155, pinion 156 and shaft 158 are supported on the casting 10. Fast on the shaft 158 is a disk 159 (Fig. 5) having in its periphery a single tooth or recess 160 (Fig. 4) adapted to be engaged by a pawl 161. Said pawl is pivoted upon an arm 162 which is rigid with a sleeve 163 (Fig. 3). Also rigid with the sleeve 163 is an arm 164 which is connected by means of a link 165 to an arm 166 (Fig. 5) which is pivoted at 167 on the casting 10. Two fingers 168 and 169 are rigid with the arm 166 and overhanging the ledge 26. A spring 170 is connected at one end to the upper end of the arm 166 and is anchored at its other end to a pin 171 (Fig. 1) directly below the axis 167. It will thus be seen that the spring 170 tends to hold the arm 166 at either side of its axis of oscillation, with one of the fingers 168 and 169 bearing against the ledge 26. To prevent reverse movement of the shaft 158, there is provided a dog 172 (Fig. 6), said dog being pivoted on the casting 10 in position to engage in any one of four equidistant notches 173 in a collar fixed on the shaft 58.

When the operator pushes a fly rearwardly along the ledges 25 and 26 (see Fig. 5), the right-hand end of the shaft $b$ of the fly engages the finger 168 and causes said finger to swing rearwardly until the upper end of the arm 166 is at the forward side of a straight line joining the points 167 and 171 (Fig. 1), whereupon the spring 170 moves the fingers 168 and 169 into the position shown in Figs. 1 and 4. The movement thus imparted to the finger 168 is transmitted through the arm 166, the link 165, the arm 164 and the sleeve 163 to the arm 162, whereby the pawl 161 is caused to turn the disk 159 through a quarter-revolution from the position shown in Fig. 5. Such quarter-revolution causes retraction of the latch 145. A quarter-revolution of the disk 159 causes one revolution of the pinion 156 and the crank 155. Some of the power to complete the revolution of the crank 155 is furnished by the spring 153. By reference to Fig. 7, it will be seen that there is a shoulder 175 on the latch 145 which is adapted to engage a shoulder 176 within the guide 146. 177 is an expansive spring which tends to move the latch 145 laterally. Near the end of the first half-revolution of the crank arm 155, the latch 145 is retracted far enough to place the shoulder 175 rearwardly of the shoulder 176, whereupon the spring 177 pushes the latch sidewise to place the shoulder 175 directly behind the shoulder 176. Near the beginning of the second half-revolution of the crank arm 155 the latch shoulder 175 stops against the shoulder 176, whereby the latch is held retracted out of position to engage the block 148.

Shortly before the carriage reaches its initial position, the block 55ᵃ (Fig. 2), which extends farther down than any of the blocks 55, engages the forward end of the latch 145 and moves said latch to the left, as viewed in Figs. 2 and 7, so as to disengage the shoulder 175 from the shoulder 176, whereupon the spring 147 projects the latch 145 forwardly to the position shown in Fig. 2. As the carriage again returns to the thirteenth position, the latch 145 yields rearwardly to allow the locking block 148 to pass and then is again advanced by the spring 147 into position to engage the block 148.

As will be understood from the foregoing, the introduction of a fly into the machine for the lacing of one side thereof causes retraction of the latch 145 to allow the machine to be started. It will also be understood that after the first side of the fly has been laced the latch 145 is again in position to prevent restarting of the machine. In order that the latch 145 shall be retracted each time the fly is indexed for the lacing of the second, third and fourth sides and shall not be retracted in case the operator should inadvertently index the fly more than three times, I provide the means to be now described.

Three arms 178, 179 and 180 are fixed on the shaft 158 (Figs. 4 and 5) in position to be engaged by the corners of a fly which has been raised into position to be indexed. The arms 178 and 180 are diametrically opposite each other, the third arm 179 being midway between the other two. For convenience, the three-arm structure just described may be termed a star wheel. The movement imparted to the star wheel by the engagement of a corner of the fly with one of the arms 178, 179 and 180 causes the pinion 156 and the crank arm 155 to turn through one revolution, power to complete the revolution being supplied by the springs 153 (Fig. 4). The latch 145 is thereby retracted. By reference to Figs. 4 and 5, it will be seen that when the disk 159 is turned by reason of the introduction of a fly for the lacing of the first side of the latter, the three-arm star wheel will be turned so that the arm 178 will stand in position to be engaged by a corner of the fly when the fly is indexed for the lacing of the second side. Similarly in the indexing of the fly for the lacing of the third side, the arm 179 will be engaged, and in the indexing of the fourth and final side, the arm 180 will be engaged. The engagement of a fly with one of the arms 178, 179 and 180 causes one revolution of the pinion 156 and the crank arm 155, with consequent retraction of the latch 145. There being no fourth arm opposite the arm 179, inadvertent indexing of the fly subsequent to the lacing of the fourth side will not cause retraction of the latch 145.

It will be seen that in the present embodiment of the invention the latch 145 prevents more than forty-eight operations of the lacing means upon the fly. The latch 145 may also be said to be sensitive to a limited number of indexing movements of the fly, namely, three such movements.

Means is provided to prevent the shaft 158 from being turned through more than ninety degrees by a vigorous turn of the fly as it is being indexed. Said means comprises a ring 181 (Figs. 5 and 6) fixed to the spur gear 157 and having upon its periphery four equidistant stop lugs 182 adapted to engage the rod 37. With the parts in initial position, as illustrated in Fig. 5, one of the lugs 182 lies at the upper side of the rod 37, the spring 153 (Fig. 4) serving to hold said lug against said rod. When a new fly is pushed past the finger 168 and into engagement with the arm 32, the pawl 161 turns the shaft 158, disk 159, spur gear 157 and ring 181 in the direction indicated by the arrow in Fig. 5, thereby placing the next lug 182 against the lower side of the rod 37. When the operator lowers the arm 32 to place the fly upon the comb, the rod 37 pushes its way past the lug 182, the ring 181 turning backward sufficiently to allow the rod to pass, after which the spring 153 returns the ring to the position shown in Fig. 6. The first side of the fly having been laced, the fly is raised, the rising of the rod 37 into contact with the lower side of the lug 182 causing the star wheel to turn a slight distance in the direction indicated by the arrow in Fig. 5. When the fly is turned or indexed through ninety degrees, engagement of one corner of the fly with the arm 178 causes the star wheel to turn until the next lug 182 stops against the lower side of the rod 37. In this manner the rod 37 and the lugs 182 prevent the shaft 158 from turning through more than a quarter-revolution through momentum or otherwise.

Before an attempt is made to return the carriage C into position beneath the first skein, it is important that the knotter shall have completed the tying of the ends of the lace of the twelfth skein, and that the lacing mechanisms on the carriage shall occupy their initial position in readiness to resume operation. If, therefore, when the brake hereinbefore alluded to is applied the machine stops before the knotting and lacing mechanisms A have come to rest in their initial position, the carriage should not be unlatched to the action of the spring-actuated carriage-returning-means until the knotting and lacing mechanisms have been manually brought to initial position. For this reason I provide the means shown at the left-hand end of Figs. 7 and 8, said means comprising a detent 183 pivoted to the carriage C at 184 and yieldingly held in normal position by means of an expansive spring 185. A latch 186 is pivoted at 187 on the base 1 in position to engage the detent 183 when the carriage comes to rest at the thirteenth position. 188 is a stop to limit gravitating movement of the latch 186. Upon the main shaft 189 of the carriage C is fixed a disk 190 having a tapered periphery to ride under a projection 191 carried by an arm 192 which is rigid with the latch 186. The disk 190 makes one revolution for each cycle of operations of the lacing and knotting mechanisms, i. e., for the operations required in lacing a skein and returning to initial position. The disk 190 is mounted in such position that when the carriage is held by the latch 68 in the thirteenth position the projection 191 is in a vertical plane extending transversely of the shaft 189 and through the portion of the disk 190 which is of greatest diameter. In the periphery of the disk 190 is a notch 193 (Fig. 1) so located with reference to the projection 191 that when the lacing and knotting mechanisms on the carriage C are in their initial position, said notch is in position to receive said projection. It will be seen that if the lacing and knotting mechanisms on the carriage C come to rest in their initial position, the projection 191 will drop into the recess 193, whereby the latch 186 is held out of engagement with the detent 183, and that if the brake acts so promptly as to stop the knotting and lacing mechanisms before they have returned to initial position, the projection 191 will rest upon the elevated portion of the disk 190 and will thus hold the latch 186 in engagement with the detent 183. In the latter contingency, the operator cannot restart the machine until he has manually turned the shaft 189 to bring the bottom of the notch 193 into register with the projection 191. As indicated in Fig. 11, the members 183 and 186 are hooked. If the operator releases the latch 68 while the latch 186 is held elevated by the disk 190, the detent 183 will move with the carriage C until the hooks on the detent 183 and the latch 186 are interengaged. The latch 183 has a beveled forward end to enable it to pass the latch 186 if the latter should be up when the latch 183 reaches it.

In practice, a supply of flies is maintained in convenient position adjacent to the front side of the machine. Assuming that the machine is idle, the carriage C being held in the thirteenth position by the latch 68, and assuming further that the fly-lifting arm 32 is in its upper position wherein the channeled end of said arm is in operative alinement with the ledge 26: The operator takes a fly, places the end of the fly shaft upon said ledge and pushes the fly rearwardly until the end of the shaft stops against the stop 30. In the rearward movement of the fly the finger 168 is swung into the position shown in Fig. 4, thereby causing retraction of the latch 145. When the end of the fly shaft stops against the portion 30 the shaft end is within the channeled end of the arm 32. With one hand the operator maintains the fly with its lower side in a horizontal plane while with the other he grasps the hand rod 35 and pulls said hand rod forward and down, thereby lowering the fly onto the comb. The operator then swings the hand lever 74 (Fig. 13

2) to the right, movement being communicated from the hand lever 74 through the bar 73 and the lever 72 to disengage the latch 68 from the block 69. The spring-actuated carriage-returning means thereupon drive the carriage C toward the left until the carriage is in operative relation to the skein farthest to the left. As the carriage approaches such position, the block 55ª (Fig. 2) engages the front end of the latch 145 and releases said latch from the locking shoulder 176 (Fig. 7), whereby the spring 147 is permitted to project the latch 145 into the position shown in Fig. 7. As the carriage reaches operative relation to the skein farthest to the left, the brake is released and the driving clutch thrown in, thus actuating the mechanisms on the carriage C and imparting a step-by-step movement to the carriage from one skein to the next. As the carriage approaches the thirteenth position the block 148 (Fig. 7) passes the latch 145, the latch 68 engages the block 69, and the carriage strikes the stop screw 104 (Fig. 3) whereupon the spring 132 actuates the lever 105—107—133 to throw out the clutch and apply the brake. The operator then raises the hand rod 35 to raise the fly clear of the comb and into the position shown in Fig. 4. The fly having been raised, the operator gives the fly a quarter turn. In the turning movement of the fly a corner thereof engages the arm 178 of the star wheel, thereby causing the crank arm 155 to turn through one revolution, thus retracting the secondary latch 145 and placing it in engagement with the locking shoulder 176. Having thus indexed the fly, the operator lowers it onto the comb and then operates the hand lever 74 to retract the primary latch 68 and restart the machine.

After all four sides of the fly have been laced, the operator raises it by raising the hand rod 36 and then grasps the fly and draws it forwardly on the ledge 26. As the right-hand end of the shaft *b* of the fly passes the finger 169, the pawl 161 is given its rearward stroke into the position shown in Fig. 5 so as to be ready to operate the latch 145 when the next fly is placed in the machine.

While the present embodiment of the invention has been described with considerable particularity, it should be understood that such detailed description has been given for the sake of clearness of understanding and not for the purpose of limiting the invention to the details described. Various modifications may be made in the construction and relative arrangement of the several mechanisms without departing from the spirit and scope of the invention as defined in the appended claims.

I claim as my invention:

1. In a skein-lacing machine, the combination of lacing mechanism, manually controlled means for actuating said mechanism to perform a cycle of operations upon a fly, and means controlled by the lacing mechanism for preventing the fly from being removed from the machine while said mechanism is in operation.

2. In a skein-lacing machine, the combination of a comb, manually operable means for placing a fly upon the comb and for removing it therefrom, lacing mechanism, manually controlled means for actuating said mechanism to perform a cycle of operations upon the fly, and means acting upon said fly-placing and removing means to prevent the fly from being removed from the comb while the cycle is being performed.

3. In a skein-lacing machine, the combination of a comb, means for placing a fly upon the comb and for removing it therefrom, lacing mechanism, and means controlled by said mechanism for preventing the fly from being removed from the comb while said mechanism is operating.

4. In a skein-lacing machine, the combination of a comb, means for placing a fly upon the comb and for removing it therefrom, a lacing carriage reciprocable along the fly, and means controlled by said carriage for preventing the fly from being removed from the comb while said carriage is in motion.

5. In a skein-lacing machine, the combination of a reciprocatory carriage, lacing mechanism on said carriage, a latch to hold the carriage, and a disk connected to revolve in timed relation to said lacing mechanism, said disk having a periphery of irregular form adapted to operate said latch, said latch being held out of operative position when the lacing mechanism on said carriage is in initial position.

6. A skein-lacing machine comprising lacing mechanism, means for reciprocating said mechanism, a latch for restraining said mechanism from movement in one direction, and means traveling with said lacing mechanism and operating in timed relation to the lacing mechanism for controlling said latch.

7. A machine for lacing skeins mounted upon a four-sided fly having, in combination, a lacing mechanism reciprocable along a fly, a latch for holding said mechanism in idle position, means operable in the introduction of a fly into the machine for withdrawing the latch, and means operable in the indexing of the fly to present the succeeding three sides to the lacing mechanism for operating the latch, said last mentioned means comprising a star wheel having three arms (two diametrically opposite each other and one midway between the other two), said star wheel being located in position for said arms to be engaged by corners of the fly in the indexing of the latter to present the second, third and fourth sides of the fly to the lacing mechanism, and connections between the star wheel and the latch for operating the latter.

8. A machine for lacing skeins mounted upon a four-sided fly having, in combination, a lacing mechanism, a controlling device for said mechanism, means operable in the introduction of a fly into the machine for operating said device, a star wheel having three arms (two diametrically opposite each other and one midway between the other two), said star wheel being arranged for engagement by the fly in the indexing of the latter to present the second, third and fourth sides of the fly to the lacing mechanism, and connections between the star wheel and the controlling device for operating the latter.

9. A machine for lacing skeins mounted upon a multiple-sided fly having, in combination, lacing mechanism, a controlling device for said mechanism, means operable in the introduction of the fly into the machine for operating said controlling device, and means actuated in the indexing of the fly to present succeeding sides to the lacing mechanism for operating said controlling device.

10. A machine for lacing skeins mounted upon a four-sided fly having, in combination, a lacing mechanism reciprocable along a fly, a latch for holding said mechanism in idle position, means operable in the introduction of a fly into the machine for withdrawing the latch, and means actuated in the indexing of the fly to present the succeeding three sides to the lacing mechanism for operating the latch.

11. A machine for lacing skeins mounted upon a four-sided fly having, in combination, a lacing mechanism, a controlling device for said mechanism, means operable in the introduction of a fly into the machine for operating said device, and means actuated in the indexing of the fly to present the succeeding three sides to the lacing mechanism for operating said device.

12. In a skein-lacing machine, the combination of a lacing mechanism reciprocable along a fly, a primary latch for holding the lacing mechanism in idle position, means to operate the primary latch, a secondary latch for holding the lacing mechanism in idle position, means for withdrawing the secondary latch, said means being arranged for actuation in the indexing of the fly to present all sides but one to the lacing mechanism, and means actuated in the replacement of a completely laced fly with another fly for withdrawing the secondary latch.

13. In a skein-lacing machine, the combination of a lacing carriage reciprocable along a fly, a primary latch for holding the carriage in idle position, means to operate the primary latch, a secondary latch for holding the lacing carriage in idle position, and means actuated in the replacement of a completely laced fly with another fly for withdrawing the secondary latch.

14. In a skein-lacing machine, the combination of a carriage reciprocable along a fly, means operable to hold the carriage in idle position, a latch for holding the carriage in idle position, a star wheel located in position to be engaged and turned by the corners of the fly in the indexing of the latter, and connections between the star wheel and the latch for withdrawing the latter.

15. In a skein-lacing machine, the combination of lacing mechanism reciprocable along a fly, a latch for holding said mechanism in idle position, a star wheel comprising three arms, two of said arms being diametrically opposite each other and the other arm being midway between the other two arms, said star wheel being located in position so that said arms shall be engaged by the corners of the fly in the indexing of the latter, and connections between the star wheel and the latch for operating the latter.

16. In a skein-lacing machine, the combination of lacing mechanism, a controlling device for said mechanism, a star wheel comprising three arms, two of said arms being diametrically opposite each other and the other arm being midway between the other two arms, said star wheel being located in position so that said arms shall be engaged by the corners of the fly in the indexing of the latter, and connections between the star wheel and the controlling device for operating the latter.

17. In a skein-lacing machine, the combination of a lacing mechanism reciprocable along a fly, means operable to hold said mechanism in idle position, a latch for holding said mechanism in idle position, and means for withdrawing the latch, the last mentioned means being arranged for actuation in the indexing of the fly to present all sides but one to the lacing mechanism.

18. In a skein-lacing machine, the combination of a comb, means for supporting a fly in and out of operative relation to the comb, and means to control the machine, said means being operable by contact with the fly in the manual indexing of the fly while in inoperative relation to the comb.

19. In a skein-lacing machine, the combination of a comb, means for supporting a fly in and out of operative relation to the comb, controlling means, and means movable by the corners of the fly while it is being indexed for operating said controlling means.

20. In a skein-lacing machine, the combination of means for rotatably supporting a fly, means to operate on the fly, a latch, to control said operating means, and means arranged to be engaged by the corners of the fly in the rotation of the latter for operating said latch.

21. The combination of a lacing mechanism, means for moving said mechanism in one direction, a primary latch for restraining said means, a starting lever for operating the primary latch, a secondary latch for restraining the moving means, and means actuated in the handling of the material to be laced for operating the secondary latch.

22. In a skein-lacing machine, the combination of a comb, manually operable means for moving a fly into and out of operative relation to the comb, lacing mechanism, manually operable means for setting said mechanism in operation, a latch for restraining said mechanism, and means operable in the handling of the fly for withdrawing said latch.

23. In a skein-lacing machine, the combination of a comb, manually operable means for moving a fly into and out of operative relation to the comb, a carriage reciprocable along the comb, manually operable means for latching the carriage in idle position, a secondary latch for holding the carriage in idle position, and means operable in the handling of the fly for withdrawing the secondary latch.

24. In a skein-lacing machine, the combination of a reciprocatory member, a latch for restraining movement of said member in one direction, a spring tending to move the latch toward said member, said latch being formed so as to yield to allow said member to move in the other direction, means for retracting the latch, a locking member for holding the latch retracted, a spring tending to move the latch sidewise into engagement with said locking member, and a part on said reciprocatory member for moving the latch laterally out of engagement with said locking member.

25. A machine for lacing skeins mounted upon a multiple-sided fly having, in combination, a lacing mechanism, a controlling device for said mechanism, means engaging the ends of the shaft of the fly for moving the fly into and out of operative relation to the lacing mechanism, ledges for guiding the ends of said shaft into association with said fly-moving means, a two-arm device located in position for one of its arms to be moved by one end of said shaft as the latter is being guided into association with said fly-moving means, the other arm being engaged by said shaft when the fly is being withdrawn, connections between said two-arm device and said controlling device for operating the latter, a star wheel the arms of which are one less in number than the number of sides of the fly, said star wheel being arranged for engagement by one corner of the fly in the indexing of the latter to present successive sides of the fly to the lacing mechanism, and connections between the star wheel and the controlling device for operating the latter.

26. A machine for lacing skeins mounted upon a multiple-sided fly having, in combination, a lacing mechanism, a controlling device for said mechanism, means engaging the ends of the shaft of the fly for moving the fly into and out of operative relation to the lacing mechanism, means for guiding the ends of said shaft into association with said fly-moving means, a member located in position to be moved by one end of said shaft as the latter is being guided into association with said fly-moving means, connections between said member and said controlling device for operating the latter, a star wheel the arms of which are one less in number than the number of sides of the fly, said star wheel being arranged for engagement by the fly in the indexing of the latter to present successive sides of the fly to the lacing mechanism, and connections between the star wheel and the controlling device for operating the latter.

27. A machine for lacing skeins mounted upon a multiple-sided fly having, in combination, a lacing mechanism, a controlling device for said mechanism, means for moving the fly into and out of operative relation to the lacing mechanism, means for guiding the fly into association with said fly-moving means, a member located in position to be moved by the fly as the latter is being guided into association with said fly-moving means, connections between said member and said controlling device for operating the latter, a star wheel the arms of which are one less in number than the number of sides of the fly, said star wheel being arranged for engagement by the fly in the indexing of the latter to present successive sides of the fly to the lacing mechanism, and connections between the star wheel and the controlling device for operating the latter.

28. A machine for lacing skeins mounted upon a multiple-side fly having, in combination, a lacing mechanism, a controlling device for said mechanism, means for moving the fly into and out of operative relation to the lacing mechanism, means operable through contact with the fly as the latter is being guided into association with said fly-moving means for operating said controlling device, a star wheel the arms of which are one less in number than the number of sides of the fly, said star wheel being arranged for engagement by the fly in the indexing of the latter to present successive sides of the fly to the lacing mechanism, and connections between the star wheel and the controlling device for operating the latter.

29. A machine for lacing skeins mounted upon a fly having, in combination, a lacing mechanism, a controlling device for said mechanism, means for moving the fly into and out of operative relation to the lacing mechanism, and means operable through contact with the fly as the latter is being guided into association with said fly-moving means for operating said controlling device.

30. The combination of means to support a fly, means for lacing skeins mounted upon the fly, and means including a latch to prevent actuation of the lacing means after a predetermined number of operations of said lacing means upon the fly.

31. The combination of means for rotatably supporting a fly, means for lacing skeins mounted upon the fly, and means including a latch which is sensitive to a limited number of indexing movements of the fly for preventing actuation of the lacing means.

In testimony whereof, I have hereunto affixed my signature.

RUSSELL P. DRAKE.